No. 730,641. PATENTED JUNE 9, 1903.
E. F. HALL.
WIRE FENCE BUILDING IMPLEMENT.
APPLICATION FILED DEC. 4, 1902.
NO MODEL. 2 SHEETS—SHEET 1.
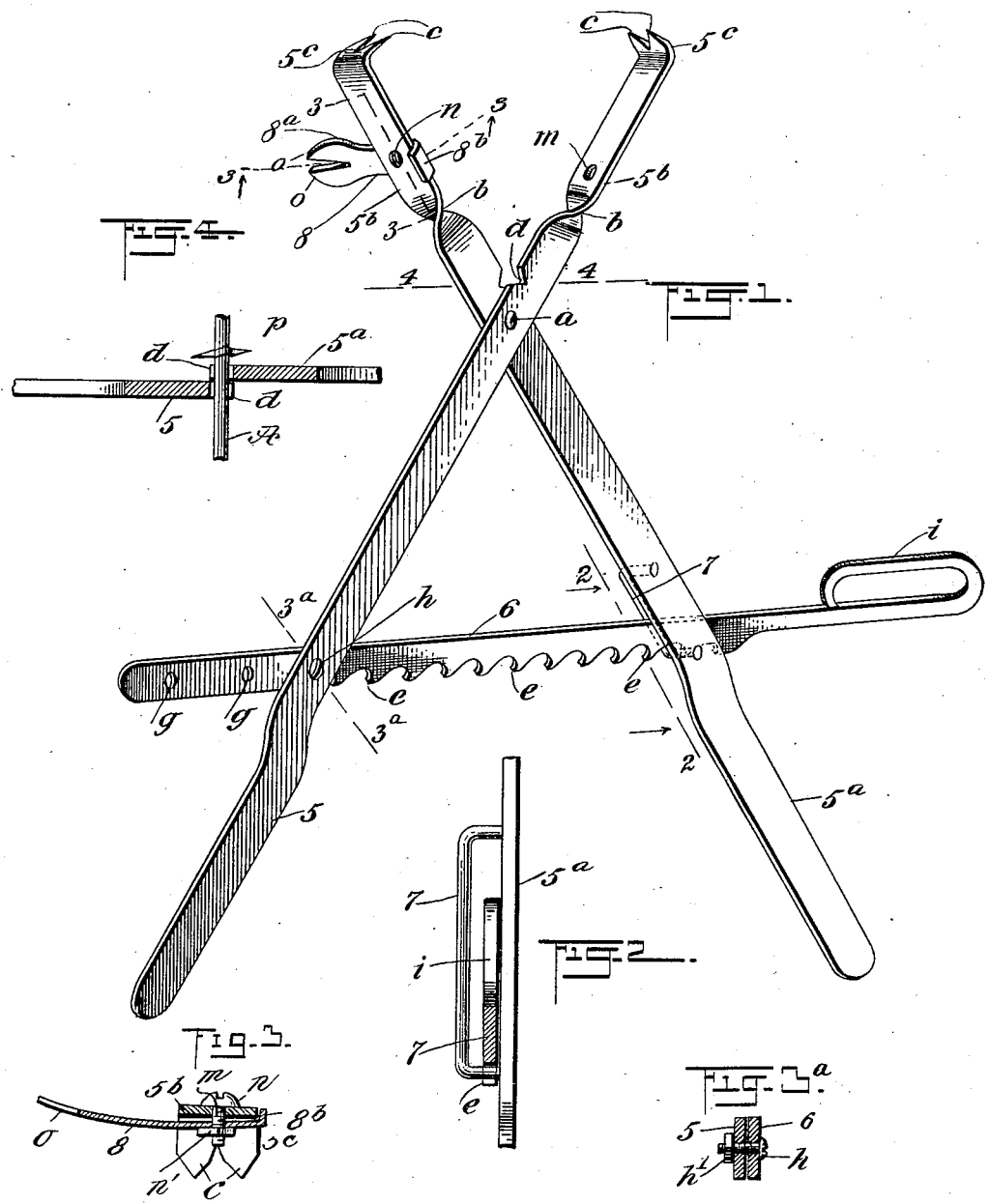
WITNESSES:
INVENTOR
Ed Francis Hall
BY
ATTORNEYS.

No. 730,641. PATENTED JUNE 9, 1903.
E. F. HALL.
WIRE FENCE BUILDING IMPLEMENT.
APPLICATION FILED DEC. 4, 1902.
NO MODEL. 2 SHEETS—SHEET 2.
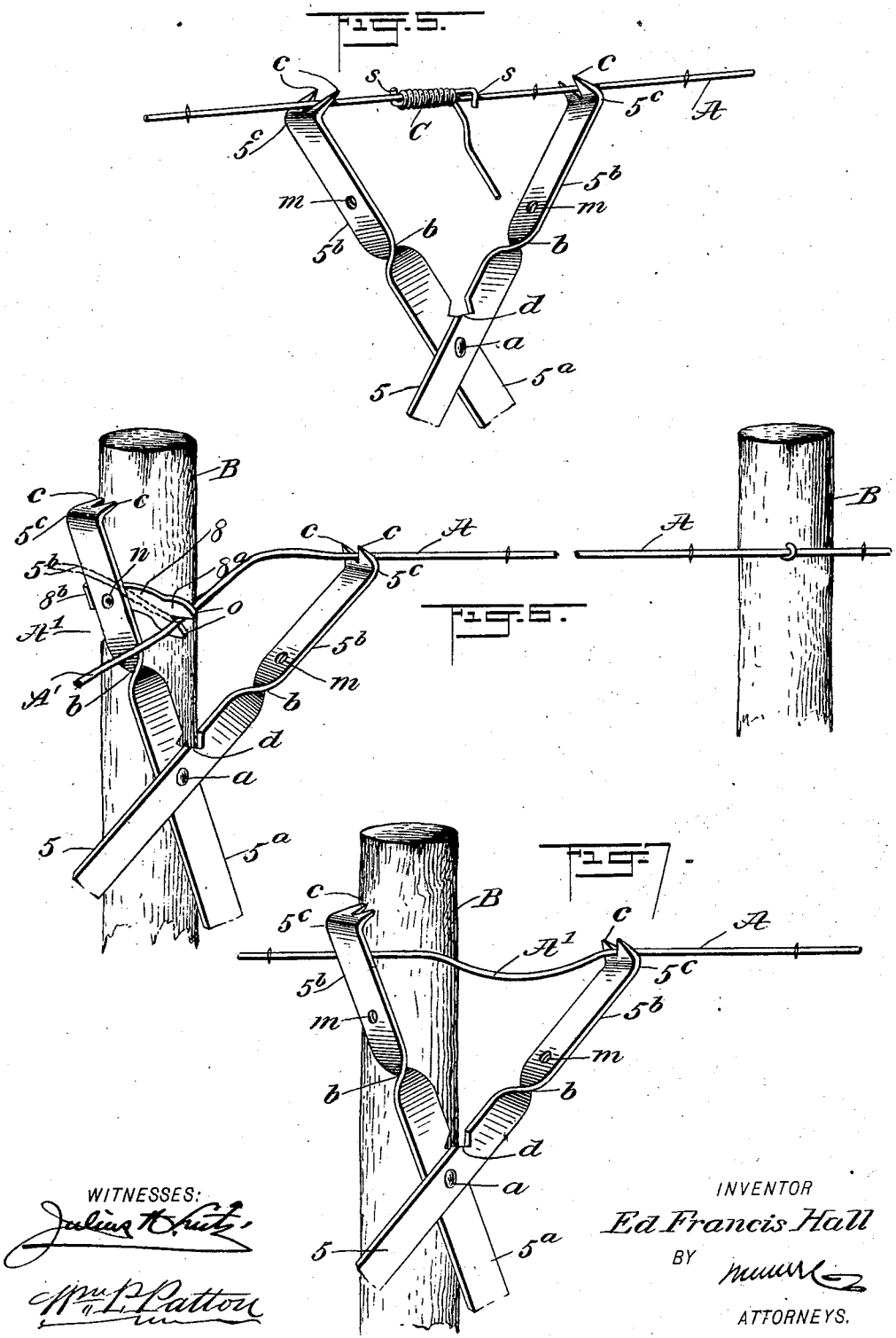
WITNESSES:
INVENTOR
Ed Francis Hall
BY
ATTORNEYS.

No. 730,641. Patented June 9, 1903.

UNITED STATES PATENT OFFICE.

ED FRANCIS HALL, OF HAYES, TEXAS.

WIRE-FENCE-BUILDING IMPLEMENT.

SPECIFICATION forming part of Letters Patent No. 730,641, dated June 9, 1903.

Application filed December 4, 1902. Serial No. 133,868. (No model.)

*To all whom it may concern:*

Be it known that I, ED FRANCIS HALL, a citizen of the United States, and a resident of Hayes, in the county of Robertson and State of Texas, have invented a new and Improved Wire-Fence-Building Implement, of which the following is a full, clear, and exact description.

This invention has for its object to provide a novel implement adapted to take up slack in an unbroken fence-wire, draw together ends of a broken fence-wire, so as to permit said ends to be spliced together, cut off surplus wire, and pull staples from the fence-posts, as occasion may require.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improved implement. Fig. 2 is an enlarged transverse sectional view substantially on the line 2 2 in Fig. 1. Fig. 3 is a transverse sectional view substantially on the line 3 3 in in Fig. 1. Fig. $3^a$ is a transverse sectional view substantially on the line $3^a$ $3^a$ in Fig. 1. Fig. 4 is a transverse sectional view on the line 4 4 in Fig. 1. Fig. 5 is a perspective view of working parts of the implement applied to draw together the ends of a broken fence-wire to splice them. Fig. 6 is a perspective view of two pivoted jaws of the implement from which the handle-levers are partially removed and of a removable arm on one jaw, showing the operation of taking up the slack in a long wire while erecting a fence; and Fig. 7 is a perspective view of the implement applied to take up slack in a stretch of wire between fence-posts on a fence that has been some time in use.

Two similar metal bars 5 $5^a$ form handle-levers for the improved implement, these parts being formed of strips of metal each having flat sides and parallel edges. At a proper distance from their ends the lever-bars 5 $5^a$ are lapped together sidewise and pivoted where they cross each other, as shown at $a$ in the drawings, material for the jaws being afforded at one end of each lever-bar. The jaw members $5^b$ near the pivot $a$ are each given a quarter-turn, as at $b$, thus disposing the bodies of the jaws so that their flat inner surfaces will be opposite each other.

A claw $5^c$ is formed on each jaw $5^b$ at its free end by bending a short portion inwardly, so that these bent portions project toward each other, and tapering said portions flatwise to give them wedge form. Each bent end is centrally notched, these V-shaped notches forming two toes $c$, that have sharp inner edges on each claw $5^c$, the use of which will hereinafter be explained.

At a point near the pivot $a$ a preferably V-shaped notch $d$ is formed on the inner edge of each jaw member $5^b$. These notches being opposite each other have sharp opposite edges and afford shears for severing a fence-wire A by their engagement therewith, as shown in Fig. 4.

A latch-bar 6 is provided to hold the handle portions of the lever-bars 5 $5^a$ at any angle of divergence the use of the implement may require, said latch-bar having a flat body and a series of spaced teeth $e$ formed on one edge. A plurality of perforations $g$ are formed in the latch-bar 6, near one end thereof, either of these holes being available for the introduction of the headed pivot-bolt $h$ therethrough. The pivot-bolt $h$ has a loose engagement within a perforation in the lever-bar 5 and may be held in place by a nut $h'$ on the threaded end of the same that extends through the latch-bar 6, as shown in Fig. $3^a$. The teeth $e$ that are formed on the edge of the latch-bar 6 which is farthest from the jaws $5^b$ preferably hook toward the pivot-bolt $h$ and may individually interlock with an end member of the keeper-loop 7, through which the latch-bar extends outward and terminates in a handle-ring $i$, which affords means for the convenient manipulation of the latch-bar.

A perforation $m$ is formed in each of the jaw members $5^b$ near the twist $b$, and by means of a bolt $n$ and nut $n'$ a short arm 8 is changeably secured on either jaw, the bolt passing through a perforation $m$ and through a similar perforation in the arm 8. As shown, the arm 8 is provided with a claw $8^a$, said arm being notched on one end to form said claw, this V-shaped notch affording two toes $o$, that are sharp on their inner edges. To prevent the arm 8 from rocking on the bolt $n$, an abutment-flange $8^b$ is formed on the end opposite the claw $8^a$ by bending said end portion at a right angle, the flange bearing against the edge of the jaw $5^b$, upon which it is mounted, so that when the bolt $n$ and nut $n'$ are adjusted to secure the arm on the jaw said arm will be projected from the jaw, either as shown in Fig. 1 or as represented in Fig. 6. It will be seen that the arm 8 may be placed on either jaw member $5^b$ and be secured thereto; also that the arm may be extended from either edge of either jaw, as occasion may require. To adapt the arm 8 to hold a fence-wire engaged in the V-shaped notch between the toes $o$, said arm is bent laterally between its ends, as is shown in Figs. 3 and 6.

The improved implement is especially well adapted for use in the erection of new wire fences that require the wire strands A to be stretched taut and held thus by staples straddling the wire and driven into the supporting-posts B in the usual way, and it may also be employed for repair of such fences, the work in both cases being done by one person easily and rapidly and in a superior manner, which is a great advantage claimed for the improvement.

In Fig. 6 a representation of the implement in use to stretch a long wire in the erection of a new fence or for the renewal of wires on an old fence is shown. Assuming that a proper number of spaced posts B have been planted in the ground ready to receive fence-wires and that the single fence-wire shown is the upper wire and the first to be secured thereon, the operator secures one end of the wire to a post that may be one hundred yards from the one on which the wire is to be secured after it is rendered taut. The implement is now employed to stretch the wire as follows: One claw $5^c$ is embedded in the post B, and in this case as the wire A is to be drawn from right to left the claw is that one which is formed on the jaw $5^b$, forming a member of the lever-bar $5^a$. After the claw $5^c$ is engaged with a side of the post B the jaw on the lever-bar 5 is spread from the stationary jaw by opening the lever-bar 5 or, in other words, by moving it away from the lever-bar $5^a$. The claw on the jaw of the lever-bar 5 is now hooked upon the wire strand A, and the lever-bar 5 is subsequently rocked toward the lever-bar $5^a$, which will correspondingly move the claw $5^c$ that is hooked fast upon the wire and pull the latter toward the post B, whereon the other claw $5^c$ is hooked, and the latch-bar 6 is now hooked upon the keeper-loop 7 to prevent a reverse movement of the jaw that is being pulled by the tightened wire A. The slack wire is now introduced within the claw on the arm 8 and is drawn taut therein, so that the sharp edges of the V-shaped notch into which the wire is drawn will grip said wire and hold it. To insure such a retention of the wire A in a taut condition, the slack portion A' near the arm 8 may be bent angularly, so as to dispose it at one side of the arm, as shown by dotted lines in Fig. 6, which will hold the wire until the stretched portion is secured upon an adjacent fence-post. In case there is considerable slack A' in the fence-wire which is not all taken up by one pull on the same the operation should be repeated until the fence-wire is properly tightened and is thus held by adjustment of the latch-bar 6. The operator can now secure the wire to the post with one or more staples and then proceed with the stretching of another length of wire, as already explained.

In Fig. 7 the operation of tightening wires that are portions of an old fence undergoing repairs is shown. In this application of the device the arm 8 may be dispensed with, as the wires are not generally very slack, and the implement by one pull on the wire will take up the slackness of the wire and hold it until a staple is inserted in the post to which the device is applied.

In case a fence-wire is broken between two posts the implement may be conveniently used for repair of such wire by employing it as shown in Fig. 5. The end portions of the wire are picked up and respectively placed in the claws $5^c$ after a right-angle bend or hook $s$ is formed on the extremity of each end, the jaws of the implement being spread apart previously to such engagement. The lever-bars 5 $5^a$ are now pressed toward each other, so that the broken end portions of the wire may lap more or less, and the latch-bar 6 is secured upon the staple-loop 7 to hold the wire ends in lapped condition. The wire is now spliced by wrapping a binder-wire C around the lapped portions of the fence-wire, and any surplus of this binder-wire, as well as of the laterally-bent ends $s$, may be trimmed off by use of the shears $d$, thus completing the splice in a neat and durable manner. It will be seen that if the arm 8 is changed from one jaw $5^b$ to the other one, as may be necessary, the slackness of fence-wires may be taken up in either direction and be held by the arm until the wire is secured, as before explained.

In using the implement to pull out staples from the posts B in case a considerable number are to be removed the latch-bar 6 may be removed from the implement and the claws $5^c$ be applied as jaws of pincers upon the staples, gripping them and holding each as it is engaged until it is removed by a rocking movement of the implement.

Having thus described my invention, I claim as new and desire to secure by Letters Patent—

1. A wire-stretcher, comprising two flat-bodied lever-bars pivoted together near one end thereof, the short ends of the said bars having quarter-turns formed thereon, providing two opposed jaws, each jaw having a notched claw on its end, said claws being bent toward each other and each having a V-shaped notch, a short laterally-bent detent-arm having a notched claw on its free end and a flange at the other end bent at a right angle, means for detachably securing the detent-arm on either jaw, and means for holding the lever-bars at any desired point of rocking adjustment.

2. A wire-stretcher, comprising two lever-bars pivoted together near one end thereof, jaws on the short ends of the lever-bars, each jaw having a notched claw, said claws being bent toward each other, and means for holding the lever-bars at a desired point of rocking adjustment, said means comprising a latch-bar having a plurality of spaced perforations near one end thereof, an adjustable screw passing through either of said perforations and into a perforation in one of the lever-bars, spaced teeth formed on one edge of the latch-bar, and a keeper-loop on the other lever-bar, whereon the teeth of the latch-bar may hook, and a handle on the end of the latch-bar, which projects through the loop.

In testimony whereof I have signed my name to this specification in the presence of two subscribing witnesses.

ED FRANCIS HALL.

Witnesses:
F. F. DOHERTY,
ALLIE DOHERTY.